(12) United States Patent
Kalman et al.

(10) Patent No.: US 6,839,249 B2
(45) Date of Patent: Jan. 4, 2005

(54) AC-TO-AC POWER CONVERTER WITHOUT A DC LINK CAPACITOR

(75) Inventors: Gabor Kalman, Palos Verdes, CA (US); Colin Huggett, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 328 days.

(21) Appl. No.: 09/759,054

(22) Filed: Jan. 10, 2001

(65) Prior Publication Data

US 2002/0089864 A1 Jul. 11, 2002

(51) Int. Cl.[7] ............................................. H02J 3/36
(52) U.S. Cl. ......................... 363/35; 363/37; 363/39
(58) Field of Search ................................ 318/138, 244, 318/254, 439, 807, 808, 722, 729, 44, 45, 46; 363/34, 35, 37, 39, 123, 84, 95, 89, 98, 132

(56) References Cited

U.S. PATENT DOCUMENTS

| | | | | |
|---|---|---|---|---|
| 3,872,364 A | * | 3/1975 | Hubner .......................... 363/37 |
| 3,887,859 A | | 6/1975 | Hubner |
| 4,056,766 A | | 11/1977 | Zander |
| 4,063,302 A | | 12/1977 | Donig et al. |
| 4,443,747 A | * | 4/1984 | Chausse et al. ............. 318/723 |
| 4,565,957 A | * | 1/1986 | Gary et al. .................. 318/722 |
| 4,783,728 A | | 11/1988 | Hoffman ....................... 363/37 |
| 4,833,584 A | * | 5/1989 | Divan ........................... 363/37 |
| 5,285,365 A | | 2/1994 | Yamao et al. |
| 5,428,283 A | | 6/1995 | Kalman et al. |
| 5,574,636 A | | 11/1996 | Lee et al. ..................... 363/132 |
| 5,585,708 A | * | 12/1996 | Richardson et al. ......... 318/722 |
| 5,793,626 A | * | 8/1998 | Jiang ........................... 363/126 |
| 5,798,631 A | * | 8/1998 | Spee et al. ..................... 290/31 |
| 5,801,517 A | * | 9/1998 | Borle ........................... 323/207 |
| 5,808,440 A | * | 9/1998 | Bennett et al. .............. 318/778 |
| 5,949,204 A | * | 9/1999 | Huggett et al. .............. 318/254 |
| 5,949,664 A | * | 9/1999 | Bernet et al. .................. 363/37 |
| 6,084,786 A | * | 7/2000 | Rozman ........................ 363/48 |
| 6,166,929 A | * | 12/2000 | Ma et al. ........................ 363/37 |
| 6,366,483 B1 | * | 4/2002 | Ma et al. ....................... 363/87 |

OTHER PUBLICATIONS

Database WPI, Week 200114, Derwent Publication Ltd., London, GB; An 2001–134408; XP002238725 "Three–phase pulse width modulation involves changing switching points . . . " & KR 2000 032 765 A (Lee Hyan Kong et al.) Jun. 15, 2000 the whole document.

* cited by examiner

Primary Examiner—Gary L. Laxton
(74) Attorney, Agent, or Firm—Oral Caglar, Esq.

(57) ABSTRACT

An ac-to-ac power converter includes a source-side inverter that is operated in current mode and a drive side inverter that is operated in commutation mode. The source side inverter performs current regulation during a first portion of each modulating cycle and space vector modulation during a second portion of each modulating cycle.

13 Claims, 3 Drawing Sheets

AC-TO-AC POWER CONVERTER WITHOUT A DC LINK CAPACITOR

BACKGROUND OF THE INVENTION

The present invention relates to electrical power conversion systems. More specifically, the present invention relates to an ac-to-ac converter.

Many aircraft include electric drives, ac distribution systems and ac-to-ac converters. Typically, the ac-to-ac converter converts ac power from the distribution system to a frequency that is suitable for operating an ac electric drive.

Two basic types of converters are usually used to perform the ac-to-ac conversion in aircraft. The first type of converter includes a source-side inverter for converting ac source power to dc power and supplying the dc power to a dc link; a low-impedance dc link capacitor connected across the dc link for smoothing dc link voltage; and a drive-side inverter for converting the dc power on the dc link to ac power.

The dc link capacitor tends to be large and heavy. Moreover, both the source-side and drive-side inverters are switched at high frequencies, which leads to high switching losses.

The second type of converter includes a single so-called "matrix" inverter. The matrix inverter does not have a dc link or a dc link capacitor. However, the matrix inverter includes more switches than the first type of converter (for three-phase power conversion, a typical matrix inverter includes 50% more switches). The additional switches make the matrix inverter more expensive. Moreover, switching of the matrix inverter is more difficult to control due to the greater number of switches, and the switching logic is more complex.

It would be desirable to eliminate the dc link capacitor in the first type of converter. Eliminating the dc link capacitor would reduce the weight, which, in turn, would reduce aircraft fuel consumption and aircraft operating costs.

It would also be desirable to reduce the switching losses in the first type of converter. Simplifying the switching and reducing the switching frequency would reduce switching losses.

SUMMARY OF THE INVENTION

According to one aspect of the present invention, an ac-to-ac converter includes a source-side inverter; a drive-side inverter; a dc current link coupled between the source-side inverter and the drive-side inverter; and a controller for operating the source-side inverter in current mode and the drive-side inverter in commutation mode.

Switching of the drive-side inverter is simple. High frequency switching is performed in the source-side inverter only. Moreover, the converter does not need a large dc link capacitor.

DETAILED DESCRIPTION OF THE INVENTION

Figure 1:
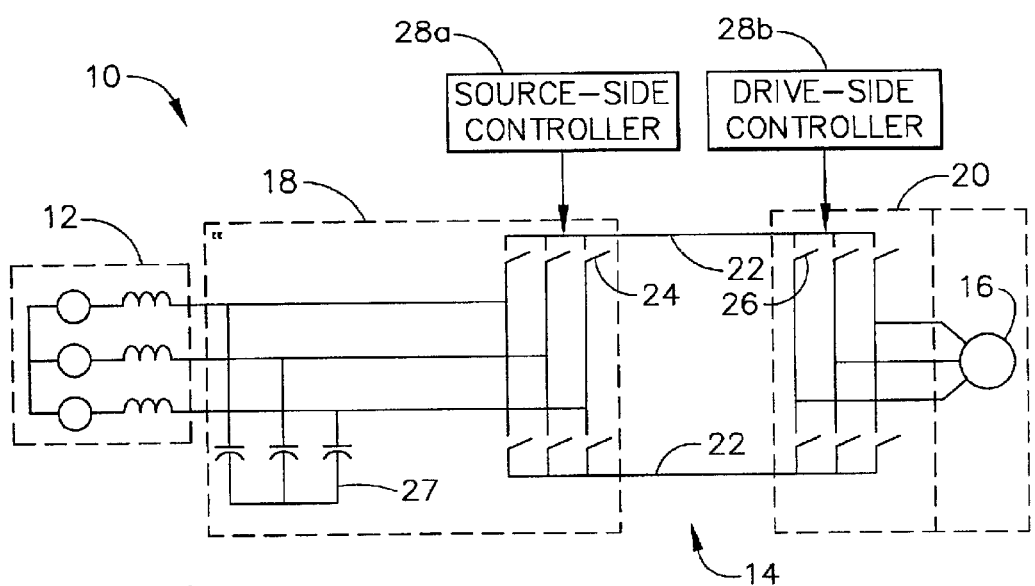
FIG. 1 is an illustration of a system including an ac distribution system, an ac-to-ac power converter and an electric motor.

Referring to FIG. 1, a system 10 includes an ac power source 12, an ac-to-ac power converter 14 and an electric motor 16. The ac power source 12 supplies three-phase ac power at a first frequency, and the ac-to-ac converter 14 converts the ac power to a second frequency that is suitable for the electric motor 16. In an aircraft, for example, the ac power source 12 might include an ac distribution system that provides three-phase 400 Hz ac power, and the motor 16 may be a permanent magnet ac motor for a compressor. The ac-to-ac converter converts the 400 Hz ac power to variable frequency power and supplies the variable frequency power to the ac motor.

Figure 1A:
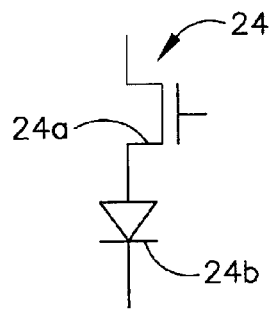
FIGS. 1a and 1b are illustrations of switches for source-side and drive-side inverters of the power converter.
Figure 1B:
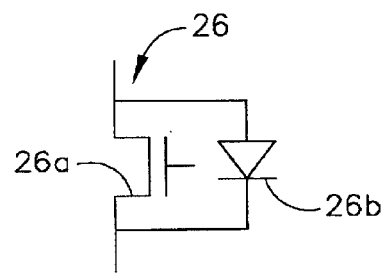

The ac-to-ac converter 14 includes a "source-side" solid-state inverter 18, a "drive-side" solid-state inverter 20 and a dc current link 22 coupled between an output of the source-side inverter 18 and an input of the drive-side inverter 20. The source-side inverter 18 includes six switches 24: each inverter phase includes two switches 24 (an upper switch and a lower switch). Each switch 24 of the source-side inverter 18 includes a controllable solid-state device (e.g., an IGBT or MOSFET device) 24a and a diode 24b (see FIG. 1a). The drive-side inverter 20 also includes six switches 26: each inverter phase includes two switches 26 (an upper switch and a lower switch). Each switch 26 of the drive-side inverter 20 includes a controllable solid-state device (e.g., an IGBT or MOSFET device) 26a and a diode 26b (see FIG. 1b).

The ac-to-ac converter 14 is terminated in a three-phase capacitor bank 27 at the source side. The capacitor bank 27 supplies a low source impedance to the inverters 18 and 20, supplying current when two switches 24 in different phases of the source side inverter 18 are closed. When two switches 24 in the same phase of the source-side inverter 18 are closed, the dc link current freewheels through the shorted phase of the source-side inverter 18, and no current is extracted from the capacitor bank 27. In addition, the capacitor bank 27 provides EMI protection.

The ac-to-ac converter 14 also includes a source-side controller 28a for controlling the source-side inverter 18 in a current mode and a drive-side controller 28b for controlling the drive-side inverter 20 in a commutation mode. While the source-side inverter 18 is operated in current mode, only two of its six switches 24 conduct current at any time. While the drive-side inverter 20 is operated in commutation mode, only three of its six switches 26 conduct current at any time. Switching of the drive-side inverter 20 is performed at 60-degree intervals relative to the fundamental frequency of the motor 16. This makes for a simple control.

The source-side inverter 18 is modulated at a high frequency (e.g., 20–40 kHz for 400 Hz power). Switching of the source side inverter 18 is performed at frequency that is compatible with the type of power switch being used, (for example, 20 KHz for an IGBT). The frequency is selected to minimize ripple on the drive side, which depends upon the inductance of the motor 16. Increasing the switching frequency reduces the size of the capacitor bank 27 but increases the switching loss for the source-side inverter switches 24.

Figure 2:
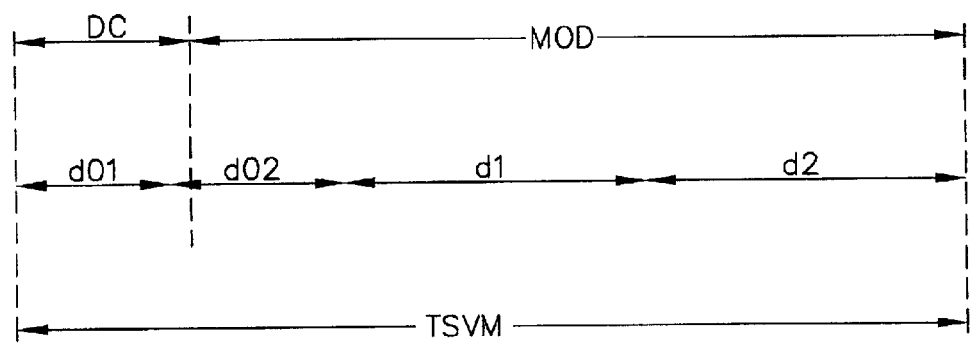
FIG. 2 is an illustration of a modulating cycle for the source-side inverter.

Reference is now made to FIG. 2, which shows a modulating cycle for the source-side inverter 18. Each modulating cycle of the source-side inverter has a period TSVM. Each modulating cycle includes a current regulation portion DC, which has a first duty cycle d01. The current regulation portion DC is that portion of the modulation cycle required to control the average current in the dc link 22. During the current regulation portion DC of each modulating cycle, the source-side inverter 18 may be controlled as a current-regulated buck (down) chopper to maintain a controlled, constant current on the dc current link 22. The source-side controller 28a commands the switches 24 of the source-side inverter 18 to short the dc link 22 (both top and bottom switches 24 of a single inverter phase are closed) for the specified duty cycle d01.

Each modulating cycle also includes a Space-vector modulation ("SVM") portion MOD, which includes duty cycles d02, d1 and d2. The order in which the duty cycles are arranged is arbitrary. This SVM portion MOD is controlled to provide sinusoidal currents sourced from the supply side. During the SVM portion of each modulating cycle MOD, the source-side controller 28a modulates the six switches of the source-side inverter 18 at a high frequency to extract fundamental frequency sinusoidal currents (with high order harmonic currents due to the modulating process) from the ac power source 12. Resulting on the dc current link 22 is essentially a constant dc current with high frequency components at six times the fundamental frequency of the ac power source 12 (and its associated harmonics) and at the modulating frequency (and its associated harmonics).

Figure 3:
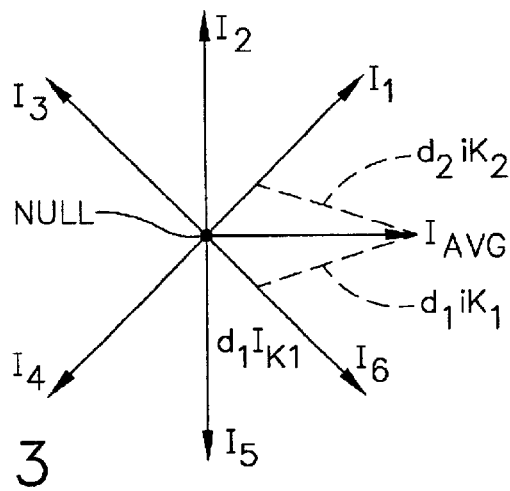
FIG. 3 is a diagram of possible vectors during current mode space-vector modulation.

Reference is made to FIG. 3, which shows a null vector and six possible current Park vectors I1 to I6 for current mode SVM. Park vectors inherently contain information on both the instantaneous magnitudes and the phase relationship of three phase rotating fields with respect to a reference coordinate system. A Park vector, in general, is a mathematical representation that describes the locus of an electrical quantity in the complex space domain (where time is a parameter). A current Park vector is defined with the vector's amplitude and the vector's direction in spatial relation to the three phases. A general discussion of Park vectors is provided in P. K. Kovacs, "Transient Phenomena in Electrical Machines," Elsevier Science Publishing Co. (1984).

Each current Park vector is displaced by 60 electrical degrees, and is produced by closing two switches in different phases of the source-side inverter 18. The null vector results from the two switches 24 in a single phase being closed, or from all switches 24 being open. For example, the null vector can occur when all switches 24 of the source-side inverter 18 are open, or when the top and bottom switches 24 of a single phase of the source-side inverter 18 are turned on, essentially short-circuiting the dc current link 22 and allowing the current to circulate through the shorted phase.

The source-side controller 28a varies the duty cycles d1 and d2 and selects the current vectors ik1 and ik2 (and the null vector) to create a rotating current vector IAVG. The duty cycles d1 and d2 are selected to produce a sinusoidal current that best matches the dc link current that is required by the motor 16. Typical SVM algorithms relate the current vector IAVG to the duty cycles d1, d2 and d02 with the corresponding ik1, ik2 and null current Park vectors. In other words, the vector IAVG is a time averaged composite vector of the ik1, ik2 and null current vectors during each SVM portion.

The source-side controller 28a uses the current vector IAVG to command the source-side inverter switches 24 to connect selected phases of the capacitor bank capacitors to the dc current link 22 and maintain a relatively ripple-free current on the dc link. Magnitude of the desired inverter current vector IAVG is essentially determined by the requirements of the motor 16, and relates directly to the torque that is being controlled by the motor 16. The angle of the desired inverter current vector IAVG is determined by the voltage vector derived from the capacitor bank 27. A unity power factor at the capacitor bank 27 would require the angle of the inverter current vector IAVG to be equal to the angle of the capacitor bank voltage vector.

The duty cycles d01 and d02 comprise the total null vector when either the top and bottom switches 24 of a single phase of the source-side inverter 18 are turned on, or when all of the switches 24 are open. In either case, no current is transferred between the source and the drive-side inverter 20 during the duty cycles d01 and d02. The average amplitude of the dc current is controlled by the duty cycle d01. The duty cycle d02 is determined by the SVM algorithm, so that essentially sinusoidal fundamental currents result in the ac distribution side, with higher order harmonics superimposed from the modulating frequency.

Figure 4:
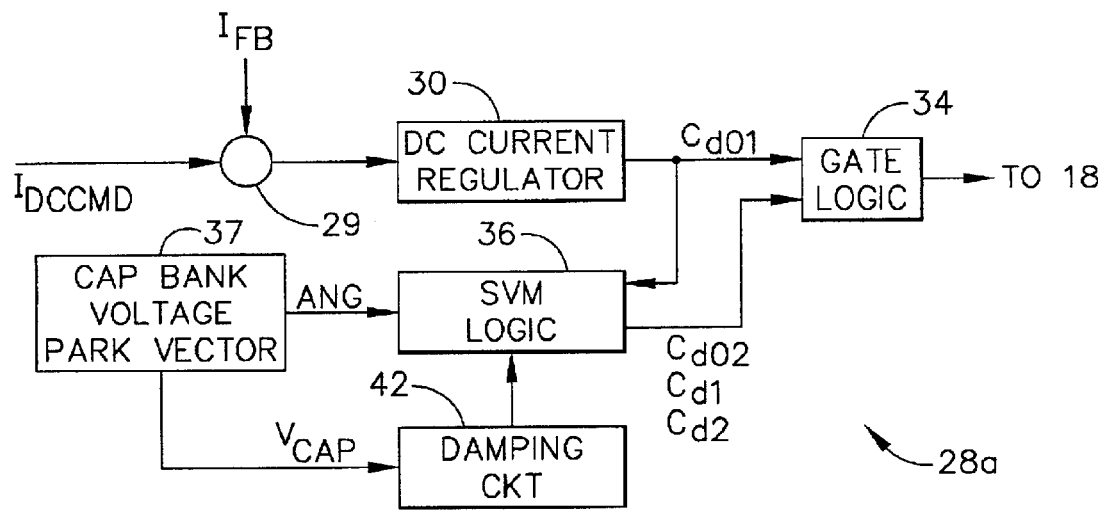
FIG. 4 is an illustration of a source-side controller for the source-side inverter.

Reference is now made to FIG. 4, which shows the source-side controller 28a in greater detail. The source-side controller 28a includes a summing junction 29 for comparing a current command IDCCMD to current feedback IFB from the dc link 24, and passing the resultant error to a dc current regulator 30, which regulates the dc current link current. This regulator 30 is typically a proportional integral regulator.

The dc regulator 30 provides a duty cycle command Cd01 to gate logic 34 and SVM logic 36. A voltage Park vector VCAP of the capacitor bank 27 is computed (block 37). The voltage Park vector VCAP may be computed from the sensed line to neutral voltages (or line to line voltages) sensed at the capacitor bank 27. The angle ANG of this voltage Park vector VCAP is also supplied to the SVM logic 36.

The SVM logic 36 selects the appropriate current vectors I1–I6 (FIG. 3), and computes and apportions the duty cycle commands Cd1, Cd2, and Cd02, based upon the remaining duty cycle (TSVM-d01) (FIG. 2) so that a sinusoidal current vector results in the supply-side source 12. The duty cycle commands Cd1, Cd2 and Cd02 are supplied to the gate logic.

The source-side controller 28a may also include a damping circuit 40. Damping is usually performed so that the input inductance and capacitance of the source side inverter 20 is not excited at its resonant frequency by current harmonics that are injected into the power source 12 by non-linear loads. Damping may be accomplished by a damped inductor or a resistor-capacitor combination or by active damping.

Figure 5:
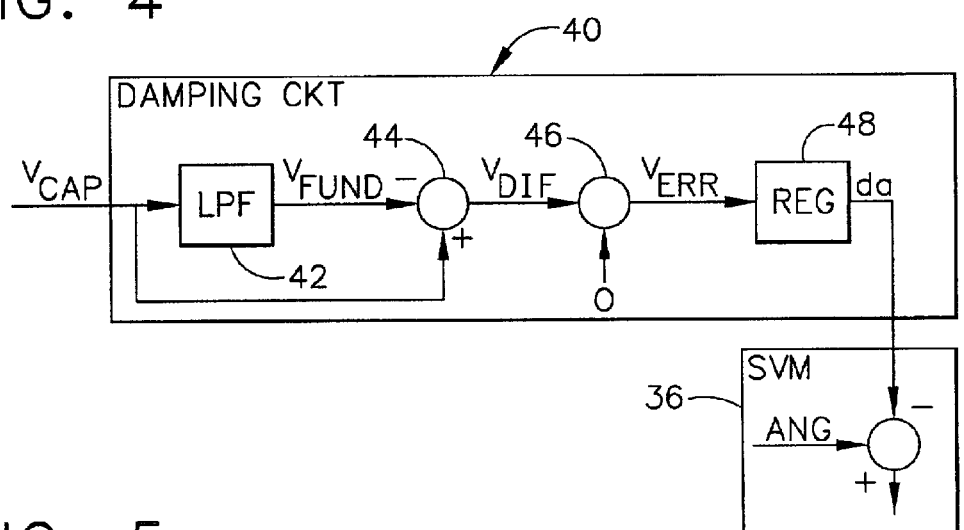
FIG. 5 is an illustration of a damping circuit for the source-side controller.

FIG. 5 shows an exemplary damping circuit 40 in greater detail. The voltage Park vector VCAP is operated upon by a low pass filter (LPF) 42, which provides a vector VFUND representing the fundamental of the capacitor bank voltage 27. The voltage Park vector VCAP and the vector from the LPF 42 are applied to a summing junction 44, which provides a difference vector VDIF, representing any resonant frequencies of the voltage Park vector VCAP. The difference vector VDIF is compared to a zero reference by another summing junction 46, and the resulting error signal VERR is applied to a proportional regulator 48 whose output provides a signal dα representing an incremental angle. The incremental angle is a corrective term that modifies the capacitor bank voltage Park vector angle ANG to minimize harmonic content on the capacitor bank 27.

As mentioned above, the drive-side controller 28b controls the drive-side inverter 20 in the commutation mode. A drive-side inverter 20 having six switches 26 will have a total of eight possible switching states when one switch 26 in each leg is conducting. Six of these switching states—which occur when power is transferred from the link 22 to the motor 16 or from the motor 16 to the link 22—may be described by six so-called "active" vectors. The remaining two switching states—which occur when all three upper switches 26 are conducting at the same time or all three lower switches 26 are conducting at the same time—may be described by null vectors. When all three upper switches 26 are conducting at the same time or all three lower switches 26 are conducting at the same time, the motor 16 is effectively isolated from the link 22.

The drive-side controller 28b commands the drive-side inverter 20 to generate active vectors only. The null vectors are imposed on the drive-side inverter 20 by the source-side inverter 18. A null vector on the drive-side inverter 20 results when the source side inverter 18 is commanded to produce a null vector. If the source-side inverter 18 commands all switches 24 off, current in the motor 16 will freewheel such that a null vector appears on the motor load. If the source-side inverter 18 commands a null vector by shorting the dc link 22, some of the motor current will freewheel through the drive-side inverter switches 26 of the shorted phase, and apply a null vector to the motor 16.

Control of the drive-side inverter 20 is limited to determining the time to commutate the drive-side inverter 20 from one motor current vector to another in order to maintain constant unity power factor at the inverter 20 and the terminals of the motor 16. With the drive-side inverter 20 maintaining a constant power factor, the source-side inverter 18 controls the amplitude of the current and, therefore, the torque, while at the same time, producing ac sinusoidal currents from the ac power source 12.

For example, the drive-side controller 28b causes the drive-side inverter 20 to perform the commutation at 6× fundamental frequency of the load at the motor 16. Switching frequency of the drive side inverter switches 26 is only a function of motor frequency, not the frequency at the source side.

Figure 6:
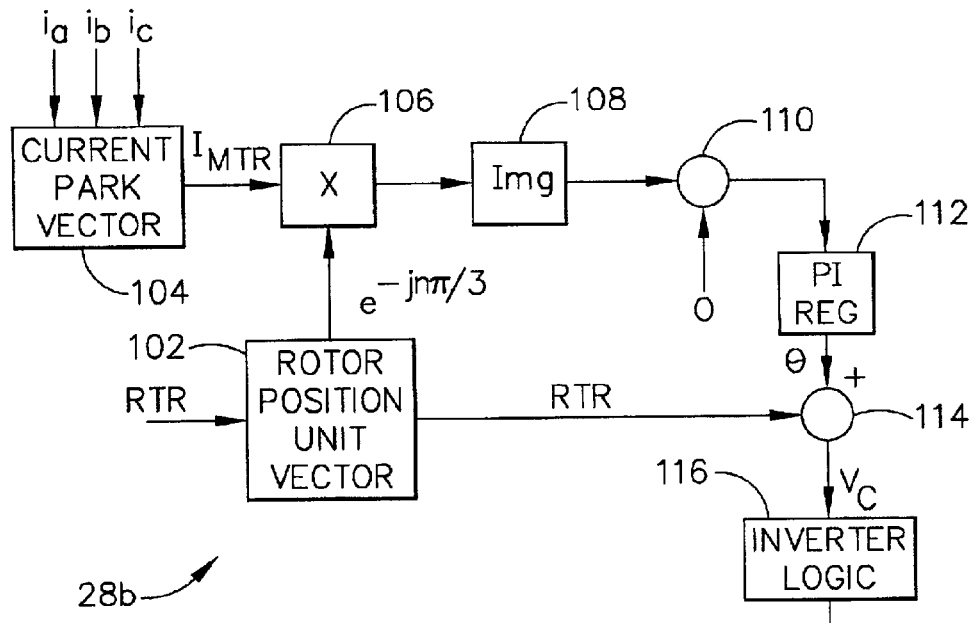
FIG. 6 is an illustration of a drive-side controller for the drive-side inverter.

Reference is now made to FIG. 6, which shows an exemplary drive-side controller 28b in greater detail. Power factor control may be performed as follows for a motor 16 having rotor position sensors. These position sensors, which may be Hall effect devices or other types of sensors, are adjusted to be in phase with the emf vector of the motor 16. The position sensors generate a signal RTR that provides information for computing a rotor position unit vector $e^{(-jn\pi/3)}$, where n is the rotor segment (block 102). For n=1,6 there are six discrete angles that are displaced 60 degrees from one another.

A Park vector I$_{MTR}$ of motor stator current is also computed (block 104). This Park vector I$_{MTR}$ may be derived by sampling the motor stator three phase currents (ia, ib, ic) at the switching frequency of the source-side inverter 18.

The rotor position unit vector $e^{(-jn\pi/3)}$ is used to achieve a coordinate transformation of the stator current Park vector I$_{MTR}$ of the motor 16 (block 106). Transformation to the synchronous reference frame is accomplished by multiplying the motor current Park vector I$_{MTR}$ by the unit vector $e^{(-jn\pi/3)}$.

The imaginary portion of the resultant vector is extracted (block 108) and compared to a reference, usually zero (block 110). The error is operated upon by a proportional integral power factor regulator 112, whose output is summed with the rotor position signal RTR (block 114). This shifts the rotor position signal RTR by an angle θ. The shifted rotor position signal is used as a commutation vector Vc by inverter logic 116 to select the appropriate Park vector which, in turn, selects the states of the six switches 26 of the drive-side inverter 20. The rotor position signal is shifted to reduce the imaginary component of the motor current Park vector I$_{MTR}$ to zero. In this way, the power factor is regulated at the terminals of the motor such that the motor current is in phase with the back emf.

The controllers 28a and 28b may be software or hardware implementations or a combination of the two.

Thus disclosed is an ac-to-ac converter 14 in which switching of the drive-side inverter 20 is simple to control. High frequency (e.g., 20 kHz) switching is performed in the source-side inverter 18 only. Moreover, the ac-to-ac converter 14 does not need a large dc link capacitor on the dc current link to perform the ac-to-ac conversion.

Although the system 10 has been described in connection with an electric motor 16, it is generally applicable to any drive. Although the system 10 has been described in connection with three-phase ac power, it is not so limited.

Figure 7:
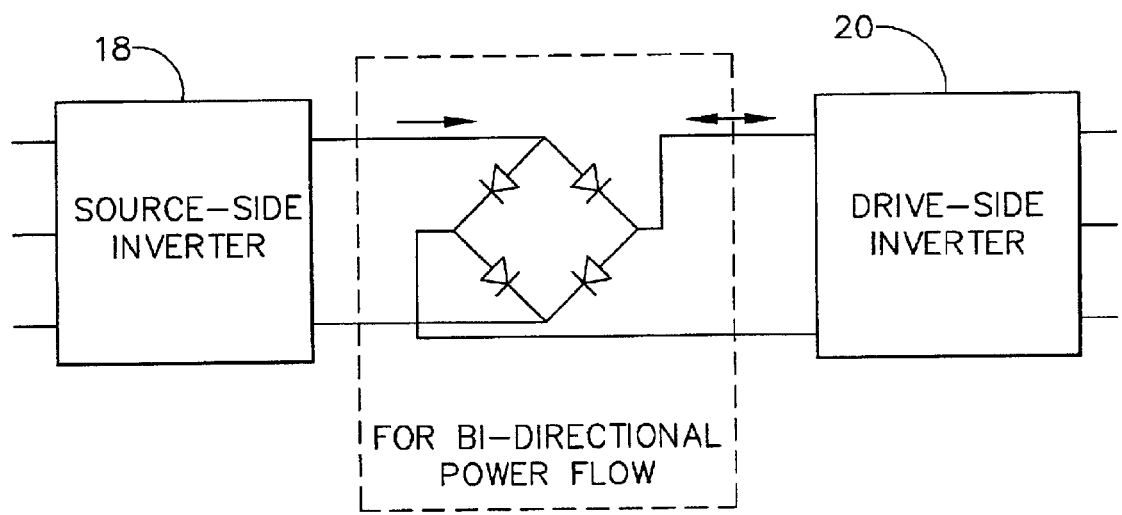
FIG. 7 is an illustration of an ac-to-ac converter including a bridge rectifier for bi-directional power flow.

Power flow in the ac-to-ac converter 10 of FIG. 1 is uni-directional. However, power flow may be made bi-directional by adding a diode bridge to the dc current link (see FIG. 7). This addition enables the source-side inverter 18 to maintain the same current direction with an inverted voltage obtained from the capacitor bank capacitors, while at the same time providing a current reversal on the drive-side inverter 20, while maintaining the same voltage polarity.

The ac-to-ac converter is not limited to the specific embodiment described above. Instead, the invention is construed according to the claims that follow.

What is claimed is:

1. Power conversion apparatus comprising:
    a source-side inverter including on/off switches;
    a drive-side inverter including on/off switches;
    a dc current link coupled between an output of the source-side inverter and an input of the drive-side inverter;
    a controller for operating the source-side inverter in current mode and the drive-side inverter in a commutation mode to achieve sinusoidal input currents at an input of the source-side inverter and sinusoidal output currents at an output of the driver-side inverter; and
    rotor position sensors for generating a position signal indicating position of a motor emf Park vector,
    wherein the controller generates a rotor position unit vector from the position signal, computes a motor current Park vector that is synchronous with respect to the emf Park vector, PI-regulates an imaginary portion of the synchronous motor current Park vector, uses the regulated imaginary portion to shift the position signal into a shifted signal, and uses the shifted signal to select switches of the drive-side inverter.

2. The apparatus of claim 1, wherein the controller performs power factor control of the drive-side inverter such that motor current is in phase with motor back emf.

3. The apparatus of claim 1, wherein the controller commands the drive-side inverter to generate active vectors only; and wherein null vectors are imposed by the source-side inverter.

4. The apparatus of claim 1, wherein the dc current link includes a diode bridge for bi-directional flow.

5. Power conversion apparatus comprising:
   a source-side inverter terminated in an ac capacitor bank;
   a drive-side inverter;
   a dc current link coupled between an output of the source-side inverter and an input of the drive-side inverter; and
   a controller for operating the source-side inverter in current mode and the drive-side inverter in a commutation mode, the controller commanding the source-side inverter to perform current regulation on the dc current link during a first portion of each modulating cycle and current mode space vector modulation during a second portion of each modulating cycles,
   wherein during each second portion the controller modulates switches of the source-side inverter to extract fundamental frequency sinusoidal currents from an ac power source,
   wherein the current mode space vector modulation produces a current vector,
   wherein the controller uses phase angle of the current Park vector to command the source-side inverter switches to connect selected chases of the capacitor bank to the dc current link and maintain a relatively ripple-free current on the dc link, and
   wherein the controller also performs damping during each second portion of the modulating cycle through modification of the chase angle by computing a Park vector of capacitor bank voltage, computing a second Park vector representing resonant frequencies of the voltage Park vector, regulating the second Park vector, and using the regulated second Park vector to correct the chase angle.

6. The apparatus of claim 5, wherein the controller varies duty cycle of each first portion to control average current in the dc link.

7. The apparatus of claim 5, wherein the controller operates the source-side inverter as a buck-chopper during each first portion to perform the current regulation.

8. A controller for a first inverter coupled between a power source and a dc current link and a second inverter coupled between an ac drive and the dc link, the controller comprising:
   a circuit for commanding the first inverter to perform current regulation on the dc current link during a first portion of each modulating cycle and current mode space vector modulation during a second portion of each modulating cycle, wherein the first inverter is terminated in a capacitor bank and wherein the space vector modulation produces a current Park vector;
   the circuit commanding the second inverter to operate in commutation mode, using phase angle of the current Park vector to command switches of the first inverter to connect selected phases of the capacitor bank to the dc current link, and performing damping during each second portion of the modulating cycle through modification of the phase angle by computing a Park vector of capacitor bank voltage, computing a second Park vector representing resonant frequencies of the voltage Park vector, regulating the second Park vector, and using the regulated second Park vector to correct the phase angle.

9. The controller of claim 8, wherein the circuit varies duty cycle of each first portion to control average current in the dc link.

10. The controller of claim 8, wherein the circuit performs power factor control of the second inverter such that motor current is in phase with motor back emf.

11. The controller of claim 10, wherein the circuit commands the second inverter to generate active vectors only; and wherein null vectors are imposed by the first inverter.

12. A controller for a first inverter coupled between a power source and a dc current link and a second inverter coupled between an ac drive and the dc link, the controller comprising:
   a circuit for commanding the first inverter to perform current regulation on the dc current link during a first portion of each modulating cycle and current mode space vector modulation during a second portion of each modulating cycle, the circuit commanding the second inverter to operate in commutation mode,
   wherein the controller generates a vector indicating back emf, computes a current Park vector that is synchronous with respect to the back emf Park vector, PI-regulates an imaginary portion of the synchronous current Park vector, and uses the regulated imaginary portion to select switches of the second inverter.

13. Apparatus comprising:
   an ac motor;
   a first switch-based inverter having an input adapted to receive ac power;
   a second switch-based inverter coupled to the ac motor;
   means for operating the first inverter in current mode and the second inverter in commutation mode to achieve sinusoidal input currents at an input of the first inverter and sinusoidal output currents at an output of the second inverter; and
   position sensors for generating a position signal indicating position of a motor emf Park vector,
   wherein the means generates a rotor position unit vector from the position signal, computes a motor current Park vector that is synchronous with respect to the emf Park vector, PI-regulates an imaginary portion of the synchronous motor current Park vector, uses the regulated imaginary portion to shift the position signal into a shifted signal, and uses the shifted signal to select switches of the second inverter.

* * * * *